United States Patent [19]

Rotter et al.

[11] 3,921,933

[45] Nov. 25, 1975

[54] TAPE TRANSPORT APPARATUS

[75] Inventors: Gerhard Rotter; Leonard S. Bleininger, both of Mission Viejo; Robert L. Gertz, Laguna Hills, all of Calif.

[73] Assignee: BASF Aktiengesellschaft, Ludwigshafen (Rhine), Germany

[22] Filed: Aug. 16, 1973

[21] Appl. No.: 388,929

[52] U.S. Cl. .................. 242/192; 242/204; 242/207

[51] Int. Cl.² ...................... G03B 1/04; G11B 15/32

[58] Field of Search ........... 242/192, 204, 207, 201, 242/202, 203, 186, 187, 188, 75.1, 75.4, 75.45, 75.46, 75.47, 75.5, 156, 156.2, 179; 226/172; 308/6 R, 3.8; 350/341 R

[56] References Cited

UNITED STATES PATENTS

| | | | |
|---|---|---|---|
| 2,605,056 | 7/1952 | DeKanski et al. | 242/54.1 |
| 2,627,323 | 2/1953 | Larson | 308/6 R |
| 3,145,065 | 8/1964 | Cator | 308/6 R |
| 3,370,804 | 2/1968 | Peyton | 242/192 |
| 3,482,800 | 12/1969 | Barnett et al. | 242/207 |
| 3,638,880 | 1/1972 | Hollingsworth | 242/192 |

*Primary Examiner*—Leonard D. Christian

[57] ABSTRACT

A tape transport apparatus in which the take-up and take-off reels are simultaneously driven by surface engagement of a capstan with the outermost tape layer on each reel. The reels are rotatably mounted on carriages which are translationally slidable with a minimum of friction and are urged towards each other by springs to provide substantially equal compressive forces at the two zones of tape engagement. The capstan has little or no resilient material on its peripheral surface to permit tape slippage under the action of a brake which, due to the provision of a unidirectional clutch, is effective only on the supply side of the apparatus. The brake is designed so that the braking torque changes substantially in direct proportion to the distance of the axis of the supply carriage from the capstan periphery. In this fashion the tape tension in the span between the above two zones of tape engagement is maintained virtually constant.

18 Claims, 14 Drawing Figures

TAPE TRANSPORT APPARATUS

BACKGROUND OF THE INVENTION

The invention relates to tape transport apparatus and more particularly to tape transport apparatus of the kind in which a pair of reels of, preferably magnetic, recording tape which form supply and take-up reels, are simultaneously driven by an annular rotating member, such as a capstan, through surface engagement with the outermost layer of tape on each reel.

Tape transport apparatus of this type for use in magnetic tape recorders are known, for example through U.S. Pat. No. 3,370,803 to Newell, in which the two reels are wound on and unwound from hubs and on which the axles supporting these hubs are rotationally mounted on carriages slideable towards and away from the capstan as the diameter of the supply reel decreases and that of the take-up reel increases during the tape transporting operation. The two carriages are urged towards each other, and hence the capstan between them, by springs. The capstan is provided with a resilient peripheral surface. The magnetic transducer is mounted for cooperation with the tape within the tape portion bordered by the two zones of engagement or interface between the capstan and the two reels respectively. In order to keep the tape span between these two zones under tension, additional spring means are employed which act to set up a higher compressive force between reel and capstan at the zone of engagement on the take-up side than at the zone of engagement on the supply side so that a greater radial deformation of the resilient peripheral surface occurs in the take-up zone of engagement than in the take-off or supply zone of engagement. As explained, for example, in the U.S. Pat. No. 3,093,284 to Mullin, this difference in deformation results, due to the ensuing elastic flow of the resilient material in the two compression zones, in a corresponding higher circumferential speed of this material in the take-up zone than in the supply zone, and hence in the tensioning of the portion of the tape between these two zones.

We have found that reliance on the "differential deformation" effect for this purpose is subject to certain disadvantages.

For one thing, in a tape transport relying on the differential deformation effect, tape loops which develope, especially between the body of the tape reel or pack on the supply side and the zone of interface between the tape and the capstan on this side, are not straightened out and as a result the transport action fails. Such tape loops may occur, for example, if a new pack which has not previously been passed through the transport mechanism is placed on the supply side of the apparatus or if a pack prior to its use in the transport apparatus has been in storage for considerable length of time and for this reason has become "soft." Tape loops may develop moreover incident to turnaround, that is, reversal in the direction of the tape drive.

Another drawback of a tape drive relying on the differential deformation principle for tensioning the tape develop, that such a drive exhibits considerable periodic variations of the tape tension due to "run out." Any runout of the capstan, or of the reels-or, more generally, the corresponding "satellite" assemblies— which is caused by tolerances in the concentricity of the hubs, tape packs or bearings, creates a change in the radial force at the interfaces between the capstan and the satellites. Also, any changes — due to manufacturing variations, wear, flat spots, etc. — in the hardness of the resilient material on the capstan, along the periphery of this "rubber tire", result in tape tension variations, and therefore flutter. Thus, the generation of a constant compressive force of either of the two satellites against the capstan is of great importance in providing a reliable transport having low flutter and small variations in tape tension. A tape drive utilizing the above-mentioned differential deformation principle is particularly sensitive to the change in the compressive force between the capstan and the satellites-for the reason that in such a drive the tape tension is generated by the difference between these forces at the two interfaces.

Run out in the tape transport normally gives rise to flutter components at frequencies determined by the once-around frequencies of all rotating parts, such as the capstan and the satellites. In transport apparatus for video tape recorders a certain amount of run out is usually accepted to keep the mechanical tolerances, and hence the cost of the transport device, within reasonable limits and consequently a servo system is generally used for controlling the speed of the tape drive. In playback the servo loop is closed, use being made of sync information recorded on the video tape. In order for the system to have enough gain for the removal of flutter due to the above causes the band width of the servo system has to be relatively large, that is, the cutoff frequency should be as high as 100 Hz or 200 Hz or even higher. Now if, as typical for the prior art systems using capstans with a resilient peripheral surface, the capstan is provided with an outer layer of resilient material such as rubber then the band width obtainable for the servo systems is limited, this limitation being due to the elastic "give" of the rubber in a peripheral shear direction which causes the rubber to act much like a low pass filter and makes the system unable to respond to relatively fast changes. In addition to the foregoing, the servo system as applied to tape transport mechanisms of the prior art, shows a resonance and an increase of flutter at frequencies between 100 and 200Hz.

Experiments have shown that a thin belt, (for example of 1 to 2 mils thickness) of plastic material such as mylar, or of a metal such as steel, when applied along the rubber coated capstan results in a greatly improved servo frequency response — because in this instance, due to the non-elastic properties of the belt — the total rubber surface is used for creating a shear moment. A capstan like this is not subject to the differential compression effect: a difference in the two radial forces in question will not create tape tension in this case.

OBJECTS AND SUMMARY OF THE INVENTION

It is an object of the present invention to provide a tape transport apparatus of the kind defined in the initial portion of this specification, which avoids the aforementioned disadvantages of the prior art mechanisms of this type.

It is another object of the invention to provide a tape transport apparatus of the kind in question and having low friction means for readily allowing the satellites to advance or retreat relatively to the annular rotating member or capstan. If the satellites, particularly in response to run outs, can move along their guide paths with low friction, that is, if only little force is required to so move them, then the transport performance is improved as regards flutter and tension variations.

More broadly it is an object of the invention to provide a tape transport apparatus which is simple in design and easy to manufacture, and yet yields superior results in operation.

Briefly the tape transport apparatus according to the invention, instead of relying on the differential deformation effect mentioned above, includes brake means coacting with unidirectional clutches, both preferably provided as part of the transport mechanism itself, to produce a drag force which is effective only on what happens to be the supply side at any given time. The compressive forces between capstan and satellite, which are of substantially the same magnitude on the tape-up side and the supply side, are high enough for a reliable and smooth drive of the satellites by the capstan, and they are low enough to allow for a certain amount of slippage or creep of the tape between the two contact zones so that the foregoing brake means — in addition to eliminating the development of tape loops of the kind referred to above — can keep the tape portion in the span between the foregoing two zones under tension.

The brake means are preferably mounted on the frame of the tape transport apparatus and are designed so that the braking torque exerted on the supply satellite is automatically reduced as the latter, due to the unwinding of the tape from the supply reel, moves in the direction of the capstan. Also preferably, the brake means are designed so that the aforementioned braking torque decreases substantially in direct proportion to the decrease, during this unwinding operation, in the spacing between the axis of the supply satellite relatively to the circumference of the capstan. In this fashion the tape tension in the span between the above mentioned two zones of engagement is kept virtually constant regardless of the variation in pack diameters during the transport operation. Low friction guide means of novel design are used to hold the resistance to the "breathing" movement of the satellites in the direction toward or away from the capstan as low as possible.

The principle underlying the invention makes it possible to dispense with the layer of resilient material on the capstan, which in the case of the prior art mentioned is needed to set up the difference in deformation as between the two zones of engagement with the satellites. If desired, a very thin layer of such material may be used in implementing the invention in order to reduce the noise in driving the two reels from the capstan, to a minimum. However, the thickness of this layer, typically between 1 and 40 mils, is merely determined by the requirement of sufficient slippage of the tape on the one hand and a low level of noise in the driving of the reels on the other hand; but this thickness is not dictated by the need to set up the above differential pressure which in the technique of the prior art is relied upon to provide the required tape tension between the two zones of contact. Alternatively, the capstan can be provided with a resilient rubber surface, a surface coating applied on top of the rubber surface to provide constant creep, and a belt placed on top of this coating to avoid tension variations and flutter.

It may be mentioned that the use of unidirectionally acting brake means on the supply side is known per se, for example, through U.S. Pat. No. 3,638,880 to Hollingsworth which provides for the two tape packs to be driven by means of a common capstan equipped with a rubber tire. This patent addresses itself to the difficulty that where the reels of tape are mounted in cartridges, the operator of a tape transport for use with hard-packed rolls — such as produced, for instance, by the mechanism disclosed in the earlier referenced Newell U.S. Pat. No. 3,370,803 — may not be aware that the particular roll of tape which he is loading into his machine, not having been so produced, does not have the hard pack characteristics. The Hollingsworth patent, in one embodiment thereof, accordingly discloses cartridges each of which individually contains unidirectionally acting brake means so as to provide the roll of tape with its own tension characteristic notwithstanding the type of transport on which it is used. However, this technique is expensive since it requires each cartridge to be equipped with a unidirectional brake. In addition, in the Hollingsworth patent there is no tape slippage, and the magnitude of the braking torque cannot be controlled as a function of the position of the supply satellite; thus, there is no way of keeping the tape tension constant as in the case of the present invention. In an alternative embodiment disclosed in the Hollingsworth patent individual motors are associated with each of the two cartridgemounted rolls, one of these motors serving as a driving motor and the other acting as a brake. With such an arrangement, however, the advantages, among others, of driving the rolls from a common capstan disposed therebetween cannot be realized.

Experiments have been made in which the periodic tape tension variations occurring, due to run out, in a transport according to the invention were compared with the corresponding variations exhibited by a prior art transport based on the differential compression principle. The results of these experiments have shown that in the instance of the transport according to the invention, the aforementioned variations were reduced by a factor of 30–50. Moreover it has been found that if, as made possible in the implementation of the invention, a capstan without rubber coating or with only a very thin rubber coating — of 1 mil thickness in some of the experiments run — is employed the frequency response of a servo system as would typically be used in applying the invention to a video tape recorder, for example, is improved and the aforementioned resonance peak at 100–200 Hz removed.

Preferred embodiments of the invention will now be described with reference to the accompanying drawings.

DETAILED DESCRIPTION OF THE PREFERRED EMBODIMENTS

Figure 1:
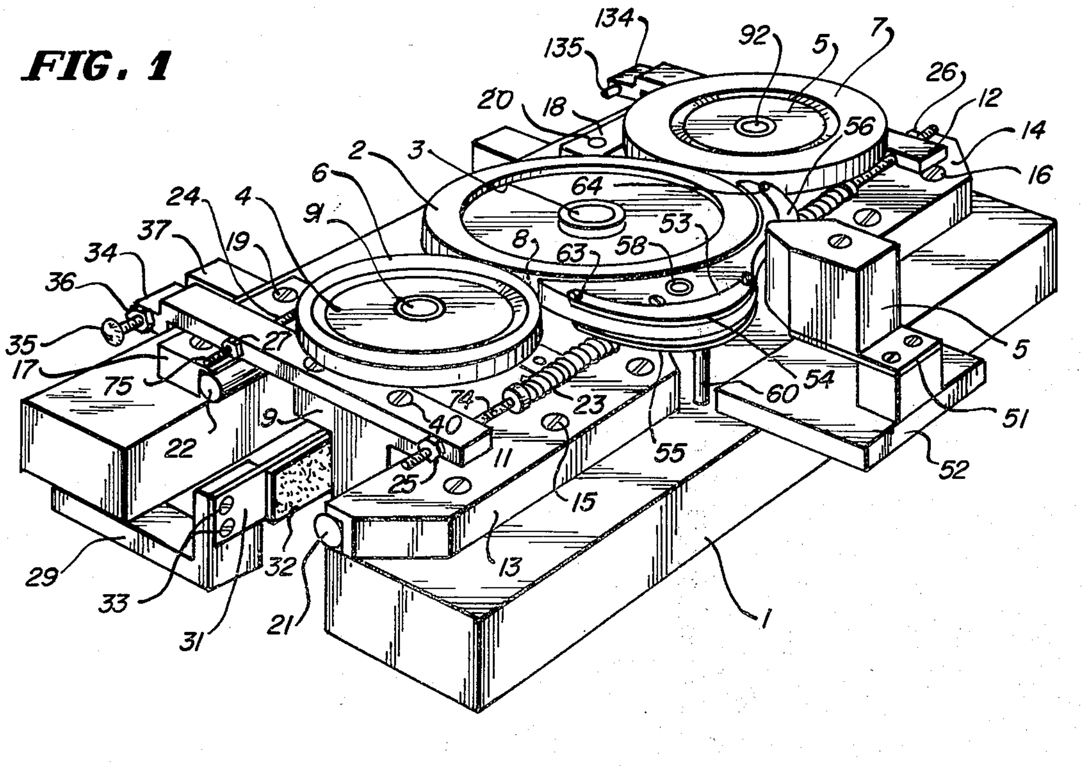
FIG. 1 is a perspective view of the top of a tape transport apparatus according to the invention, as seen from the left front.
Figure 2:
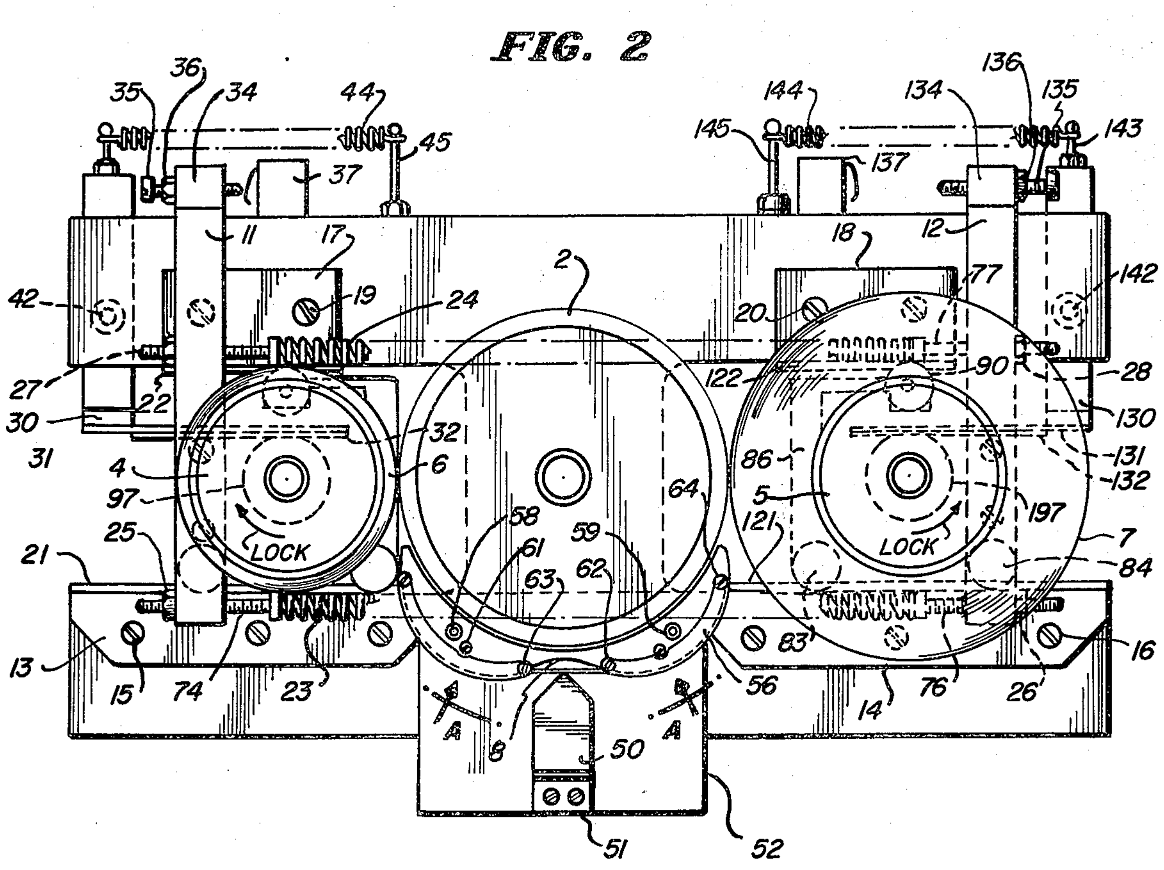
FIG. 2 is a plan view of the apparatus shown in FIG. 1.
Figure 6:
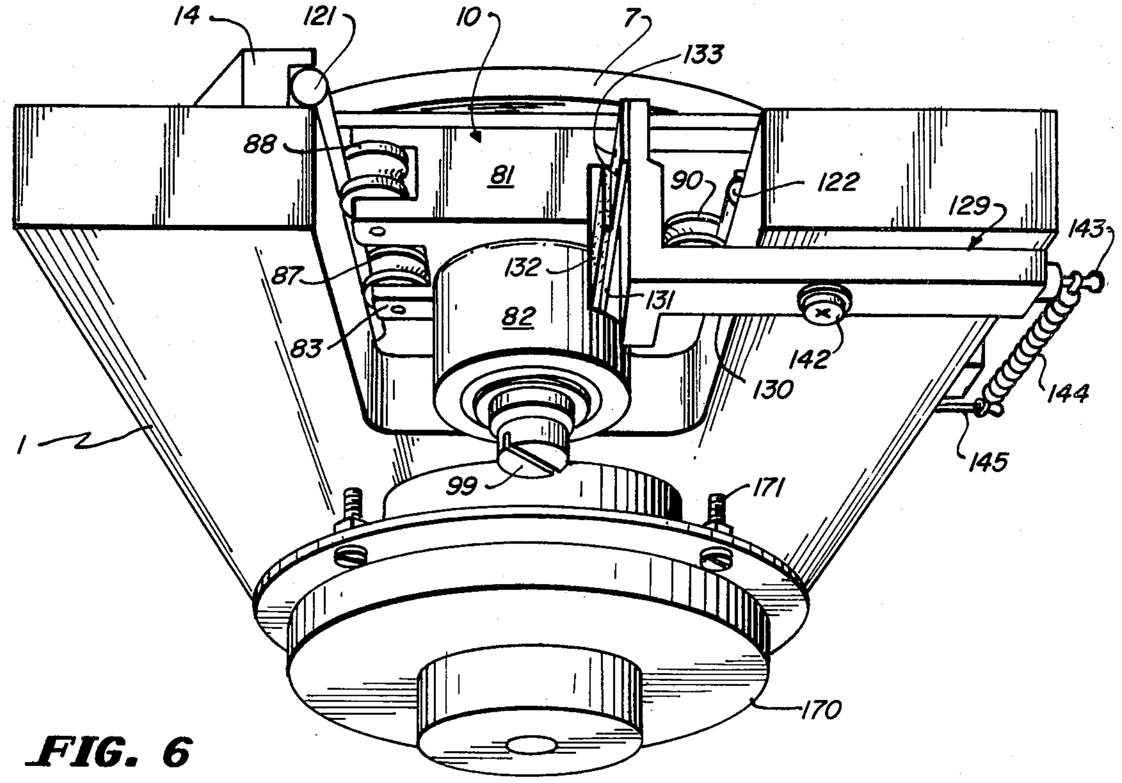
FIG. 6 is a perspective bottom view of the tape transport apparatus of the invention as seen from the right.

Referring first to FIGS. 1, 2, and 6 in which the transport mechanism as a whole is shown, 1 designates the frame of this mechanism, which, as may be seen from FIG. 2, is of generally H-configuration. Rotatably mounted in the web portion of the H-shaped frame is a shaft 3 which is driven by a reversible motor 170, FIG. 6. As shown particularly in FIG. 1 and also in FIG. 8, the two carriage assemblies 9 and 10 are mounted for translational movement with respect to frame 1, and especially to capstan 2. Assemblies 9 and 10 are provided on the left side and on the right side, respectively, of the apparatus as viewed in FIG. 2, as mirror images of each other. As will be explained in detail hereafter, each of these carriage assemblies is provided with three rollers, designated 87, 88 and 90 in the case of the right-side carriage. The two rollers of the left-hand carriage engage a longitudinally extending cylindrical rod 21 and the two rollers, designated 87 and 88, on the right side engage a corresponding guide rod 121. As may be seen from FIG. 1 and FIG. 2, rod 21 is clamped to frame 1 by means of a generally L-shaped clamp bar 13 and screws 15, and rod 121 is similarly clamped to the frame by means of a corresponding clamp bar 14 and screws 16. The single rollers on the rear side of carriage assemblies 9 and 10 are mounted for rolling engagement on corresponding longitudinally extending cylindrical rods 22 and 122, respectively. These somewhat shorter rods are clamped to frame 1 by means of likewise shorter clamp bars 17 and 18, with the aid of screws 19 and 20, respectively. Mounted on carriage assembly 9 by means of screws 40 there is a cross-bar 11 having an offset rear end 34; carriage assembly 10 on the right side has correspondingly mounted thereon a cross bar 12 having an offset rear portion 134. As will be noted from FIGS. 1 and 2, threaded rods 74 and 76 which are passed through crossbars 11 and 12, respectively, form the two ends of a coil spring 23 which extends longitudinally on the front side of the apparatus; similarly threaded rods 75 and 77 which are also mounted in these two cross-bars, respectively, terminate the two ends of coil spring 24 which extends in parallel to spring 23 on the rear side of the transport mechanism. It will be clear from the drawings that the tension of coil spring 23 may be adjusted by nuts 25 and 26 and the tension of coil spring 24 by nuts 27 and 28.

As will become clearer from the description given hereinafter of the other figures, carriage assembly 9 supports for rotation an axle, the upper end 91 of which is visible in FIG. 1, and a hub 4 rotation therewith. Correspondingly, on the other side of the apparatus carriage assembly 10 provides rotational support for axle 93 and its hub 5, the upper end of axle 93 being designated as 92. As shown in the drawings, especially in FIG. 8, the top and bottom sides of hubs 4 and 5 are beveled near their periphery but the outer peripheral surface proper of each hub has a straight cylindrical configuration.

In the drawings it has been assumed that magnetic tape 8 which is of pliable material, such as Mylar, is being unwound from hub 4 and is being wound on hub 5, that is, at the moment contemplated, hub 4 acts as the supply hub and hub 5 as the take-up hub. More particularly, it has been assumed in the drawings that most of the tape has already been unwound from hub 4 and that the supply reel 6 therefor is of relatively small diameter, and that on the other hand most of the tape has already been wound on hub 5 so that take-up reel is of a relatively large diameter.

The drive of both reels is solely due to capstan 2 engaging on its one side the outermost layer of reel 6 and on its other side the outermost layer of tape 7, the necessary compressive forces at these two points of engagement being solely provided by the pair of coil springs 23, 24, which act to draw the two carriage assemblies toward each other and thus towards the capstan 2. From the foregoing description it will be appreciated that as the tape is being unwound from reel 6 to the left side carriage assembly 9 automatically moves towards the right as the diameter of reel 6 decreases; and that similarly the right side carriage assembly 10 automatically moves likewise towards the right as the diameter of the take-up reel increases. If or when motor 170 rotates in the opposite direction, the direction of translational movement of the two carriage assemblies is correspondingly reversed, that is, they both move towards the left.

The drawings also show limit switches 37 and 137 which cooperate with screws 35 and 135, respectively, which are adjustably mounted in the offset portions of cross-bars 34 and 134, respectively. Screws 35, 135 may be locked in position by means of nuts 36, 136. These limit switches, the details of which are not important for an understanding of the invention, serve to initiate a reversing action of the system at the time carriage assembly 9 or 10, reaches the limit of its movement upon substantial completion of the unwinding of the tape on the respective side. Typically, as in the case of a transport mechanism for mult-track video tape, for example, this involves motor reversal and, in addition, vertical stepping of the magnetic transducer 50 to bring the latter into registration with the next following track on the tape. The details of this reversing arrangement have not been shown as they are not required for an understanding of the invention.

Figure 4:
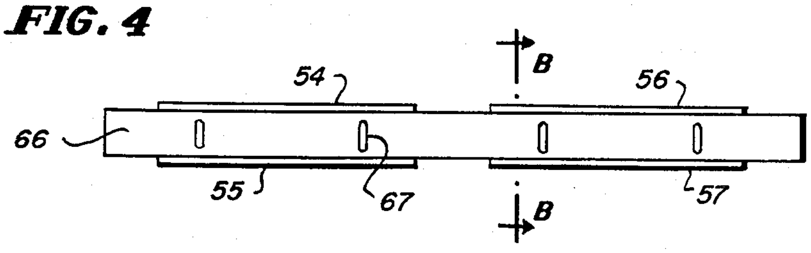
FIG. 4 is a detail illustrating the guide channel for the tape as viewed in the direction of arrows A—A, FIG. 2, that is, radially inwardly toward the capstan, and as stretched out into the plane of the drawing.
Figure 5:
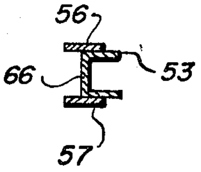
FIG. 5 is a cross-section through this guide channel taken along the line B—B in FIG. 4.

As will be seen from FIGS. 1 and 2, between the two zones of engagement of the tape by the capstan, the tape is guided by a double arc-shaped element 53 which, in the embodiment illustrated, is in the form of an air chamber. Air under pressure is admitted to this chamber through apertures 58, 59 in a manner not particularly shown herein, and the air escapes from this chamber through four slots 67 in the tape-cooperating outer surface 66 of the chamber; see FIGS. 4 and 5 in which, for the sake of simplicity, the showing of mounting means has been omitted. The air chamber 53 is mounted on frame 1 by means of spacers 60 and corresponding screws 61, 62, FIG. 2. Two pairs of guide flanges 54, 55 and 56, 57, are carried by the air chamber 53, the corresponding mounting screws being indicated by reference numerals 63 and 64. These guide flanges serve to align the tape in a direction normal to the plane of the drawing, FIG. 2, to insure the proper positioning of the tape in this direction both with respect to the magnetic recording and reproducing head 50 and the two points of engagement between the tape and capstan 2. As shown — in a generalized form — particularly in FIG. 1, the magnetic transducer 50 is mounted on a bracket 51 which is attached to a base 52, this base in turn being mounted in a suitable way on frame 1. In operation a film of air is provided, with the aid of slots 67, FIG. 4, between the tape-cooperating outer surface 66 of air chamber 53 and the rear side of the tape. As a result the tape merely rides on the cushion of air thus provided without actually touching the surface 66 of the air chamber.

The carriage assembly will now be described in more detail with reference to FIGS. 7, 8, 11 and 9, 10; it will be noted that in these figures the right-hand assembly has been singled out for purposes of illustration.

The "chassis" proper of the carriage assembly has a base portion 81 and a hub portion 82 depending therefrom. On its one side base 81 is provided with forked arms 83 and 84 in which rollers 87 and 88, respectively, are journaled for rotation. On its opposite side the base has thereon a generally L-shaped arm 86 the end of which is provided with a forked portion 85 affording rotational support for the third roller 90. The thinner leg of the L-shaped arm 86 has sufficient resiliency to cause roller 90 to be yieldingly urged against its cooperating guide bar 122, FIG. 2, in operation.

Figures 7, 8, 9, 10, 11, 12, 13:
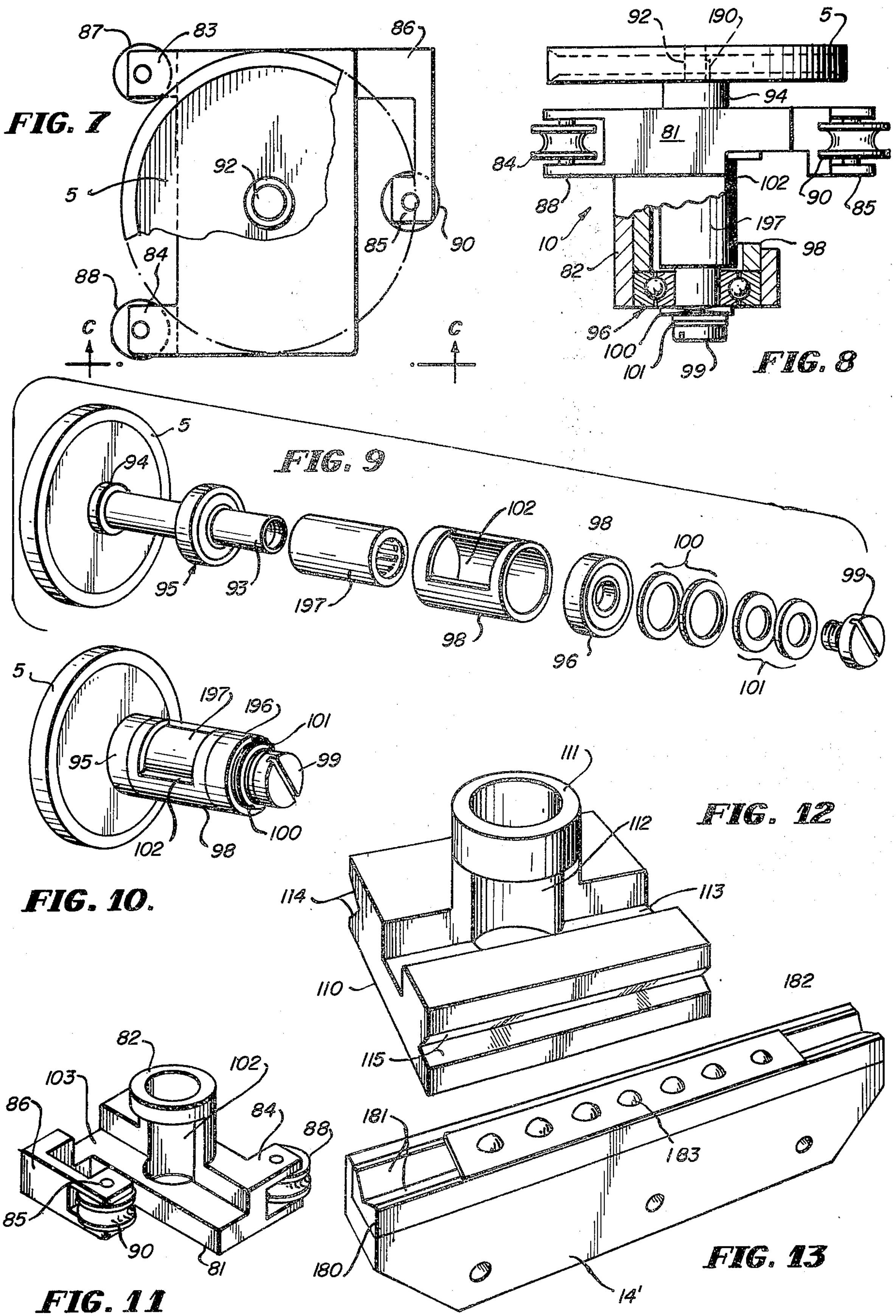
FIG. 7 is a plan view of the right-hand carriage assembly, FIG. 2.
FIG. 8 is a part-sectional view of the carriage assembly in the direction of the arrows C—C in FIG. 7.
FIG. 9 shows the unidirectional clutch together with its hub, axle and other associated parts in an exploded view.
FIG. 10 illustrates the unidirectional clutch, with hub and other associated parts, in assembled form.
FIG. 11 is a perspective bottom view of the right-hand carriage shown partly assembled.
FIG. 12 is a perspective bottom view of a modified embodiment of the carriage.
FIG. 13 is a perspective bottom view of one of the guideways designed for cooperation with the guide faces of the carriage, FIG. 11, and of a nest of bearing balls used in connection with these guideways.

From FIGS. 8 and 11 it will be noted that boss portion 82 of chassis 10 has a window 102. As will become clearer from the explanation given hereinafter, this window in conjunction with channel 103 at the bottom of base 81, makes it possible for brake pad 132 — which is mounted on brake arm 131 — to frictionally engage the outer surface of unidirectional clutch 197. Inserted into boss 82 in tight fitting relationship therewith is an insert 98, FIGS. 8, 9 and 10, which has a window 102 registering, upon assembly with the window 102 in boss 82 — for the purpose of permitting the brake to engage the outer surface of clutch 197.

FIG. 10 illustrates the unidirectional clutch 197, with hub 5 and other associated parts in assembled form and FIG. 9 shows this assembly in an exploded view. As will be noted from these figures, axle 93 is carried by roller bearings 95 and 96, the inner races of which are mounted, again with a relatively tight fit, on axle 93 adjacent the two ends of insert 102, with the inner race of roller bearing 95 bearing on its left side (as viewed in FIG. 9) against collar 94 of axle 93. The entire axle-and-clutch assembly is held together by means of screw 99 which is screwed into an inner threaded portion at the right end of axle 93 and which through the medium of elastic washers 100 and regular washers 101, causes axial pressure to be exerted on the right side of the inner race of bearing 96. It will be noted, particularly from FIG. 8, that in this manner anti-friction rotatable support is provided for axle 93 with respect to boss portion 82 of carriage chassis 10.

Clutch 197 is carried by axle 93 with some end play with respect to both bearings 95 and 96. Clutches 97 and 197 are unidirectional or over-running clutches and may be of the well-known type in which the wedging action of rollers such as 197', FIG. 9, is employed to insure engagement of the surface hardened shaft — in the present instance axle 93 — in only one direction of rotation whereas the clutch is free-wheeling in the opposite direction. The aforementioned rollers 197' are disposed in recesses in the shell of the clutch which are provided with inclined ramp surfaces not particularly shown: with the shaft (axle 93) rotating in one direction the rollers, positioned by spring means (not shown), advance into locked position on the ramps, causing the clutch to rotate with the shaft; if the shaft rotates in the other direction the rollers instantly disengage from the ramps, permitting low-friction overrunning of the clutch. Unidirectional clutches of this kind are available for example from The Torrington Company, Bearings Division, Torrington, Conn. The direction of engagement of the two unidirectional clutches 97, 197 has been indicated by the arrows marked "Lock" in FIG. 2.

At its upper end as viewed in FIG. 2 or FIG. 8, axle 93 carries hub 5 for rotation therewith. In the drawings it has been assumed that hubs 4 and 5 are fixedly attached to the upper ends 91 and 92, respectively, of the corresponding axles. This, indeed, is a possible implementation on one side of the transport apparatus. The reason for this is that, in a transport for, say, multi-track video tape with an even number of tracks, for example 28, the tape after all the turnarounds involved in a recording or playback operation eventually returns to its original side. Thus, in an application of this type arrangements need be made only on one side of the transport system to facilitate placing the hub of the tape reel on and removing it from the corresponding axle. This has been indicated by the key-and-spline connection 190, shown schematically in broken lines in FIG. 8, by which hub 5 is removably attached to the upper end 92 of axle 93. It should be understood, however, that this type of connection has been shown by way of example only and that other arrangements are possible for removably coupling a reel to an axle such as 93 for rotation.

Attention is now called to FIG. 6 which illustrates the underside of frame 1 as viewed from the right. The figure shows the mounting of driving motor 170 to the frame by means of screws 171, and it also illustrates how the rollers of carriage assembly 10 cooperate with guide rods 121 and 122 which are fixedly mounted to the front and rear ends, respectively, of the frame. FIG. 6 in addition shows the details of brake means 129 and indicates their relative position with respect to carriage assembly 10.

As will be noted, the brake means include a generally L-shaped lever 130 which is pivotally mounted on frame 1 by means of screw 142. The free end of lever 130 is resiliently urged in a clockwise direction, as viewed in FIG. 6, by means of spring 144 which is attached at one end to pin 143 extending from the right-hand end of lever 130 and at its other end to pin 145 mounted on frame 1. Preferably the location of pin 145 with respect to frame 1 may be varied, such as by providing a number of longitudinally aligned holes or a longitudinal slot on frame 1 or on a bracket attached thereto (not shown), thereby to provide for adjustment of the tension of spring 144.

The shorter leg of L-shaped arm 130 has an upward extension to which there is attached, such as by means of screws 133, a brake arm 131 in turn carrying friction pad 132 which latter may be made of felt, for example. It will be noted that parts 130 to 133 and 143 to 145 of the right-hand brake assembly 129 correspond, respectively, to parts 30 to 33 and 43 to 45 of the left-hand brake assembly visible in FIG. 1. As will be clear from an inspection of FIG. 2, brake pads 32 and 132 engage the corresponding unidirectional clutches 97 and 197, respectively, the sense of engagement of these clutches with respect to their associated axles being such that a braking action occurs only on what happens to be the supply side at the time — the left side in the condition shown in FIG. 2 —, whereas the clutch on the other side, due to the rotation of the corresponding axle in the opposite sense, is free-wheeling with respect to its axle.

FIGS. 12 and 13 illustrate an alternative technique of providing low friction rolling action of the carriages relative to guideways mounted on the frame. In FIG. 13, 110 represents the base and 111 the boss portion of this modified carriage chassis. In this modified design 112 is the window and 113 the channel which permit the associated brake means to engage the corresponding unidirectional clutch (neither one shown in FIG. 12), the latter being mounted in this chassis in the manner heretofore explained. In the present instance the V-shaped guideways stationarily mounted on frame 1 take the place of rollers such as 87, 88, and 90, FIG. 7.

FIG. 13 shows the mounting of the front right-hand guideway 180 having V-shaped guide faces 181 and clamped to frame 1 by means of clamp bar 14', the latter generally corresponding to clamp bar 14 as shown in FIGS. 1, 2, and 6. Guide faces 114 on the one hand and guide faces 181 on the other hand form races for a series of balls 183 which are nested in a thin plate 182. On the rear side of the transport apparatus another V-shaped guideway similar to guideway 180 is provided for cooperation with guideway 115. Also, while in FIGS. 12 and 13 the right-hand carriage has been singled out, it will be clear that the design of the bearing arrangement on the left side of the apparatus may be of corresponding design.

Figure 3:
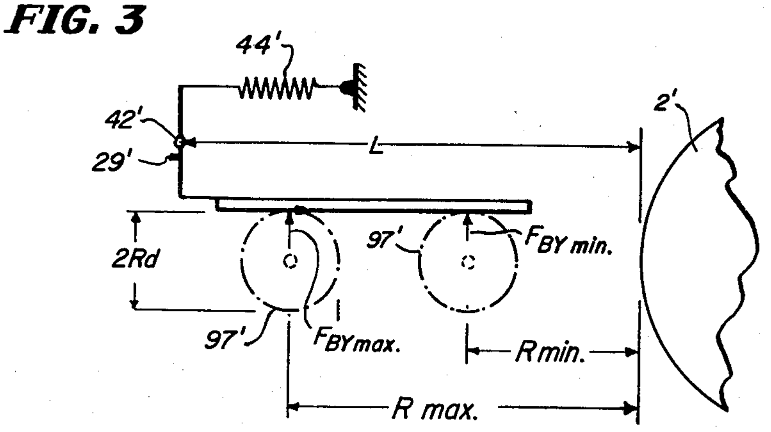
FIG. 3 is a schematic diagram illustrating how the effective brake arm changes automatically with the distance of the reel axis from the capstan.

With the design of the brake arrangement as described and illustrated, the braking torque exerted on the other cylindrical surface of unidirectional clutch 97 — assuming the left side of the apparatus being the supply side at the same time — and hence on the corresponding supply reel 6, automatically decreases as the diameter of the supply reel decreases, and as the axle of the reel accordingly moves to the right (FIG. 2) in the direction of the capstan, during operation. More particularly, the brake arrangement has been so designed that the braking torque decreases substantially in direct proportion to the decrease in spacing between the periphery of the capstan and the axis of the supply reel. In FIG. 3 the various parts of the braking arrangement according to the invention have been diagrammatically shown for the two extreme positions of the supply reel axis. The reference numerals in this diagrammatic showing are the same as those used for corresponding parts in the other figure, except that these numbers have been primed in FIG. 3.

As will now be explained with reference to this figure, it can be shown that if the braking arrangement is designed in accordance with the aforementioned proportional relationship, the tape tension in the span of tape between the above-mentioned two zones of tape engagement, that is the tape tension in the section of tape in which it cooperates with the magnetic transducer 50, remains substantially constant.

A theoretical analysis shows that if the tape tension in question is generated — as it is herein — by a brake on the supply satellite then this tape tension, or tape force, $F_t$ is represented by the equation:

$$F_t = \frac{T_{Br}}{2R} + d(F_{t_2} - F_{t_1}) \qquad (1)$$

In this equation:

$F_t$ is the tape tension in the aforementioned span,
$F_{t_1}$ is the tape tension in the outer layer of the supply pack,
$F_{t_2}$ is the tape tension in the outer layer of the take-up pack,
$d$ is a factor which, in the experiments run, happened to have the value 0.3,
$T_{Br}$ is the braking torque about the axis of the supply reel, and
$R$ as indicated in FIG. 3, is the varying radius of the tape pack.

The aforementioned experiments, as well as analysis, have shown that in the present apparatus $F_{t_1}$ is nearly equal to $F_{t_2}$ so that equation (1) reduces to $$F_t = \frac{T_{Br}}{2R} \qquad (2)$$

Now let:

$L$ be the constant distance between brake pivot 42' and the periphery of capstan 2',
$R_d$ the clutch radius,
$\mu$ the coefficient of friction of brake pad 32',
$T_s$ the torque exerted by spring 44' about pivot point 42',
$F_{Br}$ the varying radial braking force acting between brake pad 32' and the outer surface of clutch 94'.

Then:

$$F_{Br} = \frac{T_s}{(L-R)} \qquad (3)$$

$$T_{Br} = F_{Br} \cdot \mu \cdot R_d = \frac{T_s \cdot \mu \cdot R_d}{L-R} \qquad (4)$$

and by substituting (4) in (2):

$$F_t = \frac{T_{Br}}{2R} = \frac{T_s \cdot \mu \cdot R_d}{2R(L-R)} = \frac{T_s \cdot \mu \cdot R_d}{2L^2 \left(1 - \frac{R}{L}\right) \frac{R}{L}} \qquad (5)$$

Figure 3A:
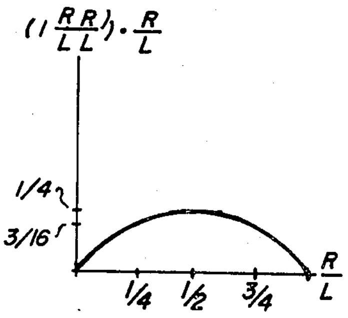
FIG. 3A is a chart supplementing the showing of FIG. 3.

From equation (4) it will be seen that with the brake arm pivoted at a point 42' lying outside of the range of movement of the axis of the corresponding carriage, as shown in the drawings and particularly in FIG. 3, the braking torque $T_{Br}$ exerted on the supply reel is indirectly proportional to the difference between the spacing of the pivot point 42' between the periphery of the capstan 2 on the one hand and the spacing R of the axis of the carriage and the periphery of the capstan on the other hand. From an examination of equation (5) it follows furthermore that tape tension $F_t$ can be held substantially constant if the expression $$\left(1 - \frac{R}{L}\right) \frac{R}{L}$$

appearing in the denominator of the equation is held substantially constant. From FIG. 3A in which this expression has been plotted as a function of $$\frac{R}{L},$$

it will be seen that the value of this expression changes very little near the center of this symmetrical curve. As a result the foregoing requirement of substantial constancy can be met if $$\frac{R}{L}$$

is made to be equal to, or nearly equal to, ½ or, otherwise expressed, if the average distance of the carriage axis from the capstan periphery, that is, $$\frac{R_{max} + R_{min}}{2}$$

is made to approximately equal $$\frac{L}{2}.$$

In short, the tape tension $F_t$ will remain substantially constant if the midpoint of the range of translational movement of the carriage axis is chosen to be substantially halfway between brake arm pivot 42' and the periphery of capstan 2'. In addition, by virtue of the brake action on the supply satellite, any slack or loop that may have developed in the supply reel, and particularly in the outermost layer thereof, will be automatically taken up.

From the foregoing description it will be appreciated, moreover, that in view of the braking action on the supply side, in conjunction with the slippage permitted at the zones of tape engagement by the capstan, means for setting up differential compressive forces at these two zones can be dispensed with: the compressive, or radially acting, forces produced at these two locations by means of the common coil springs 23, 24 are for all practical purposes of equal magnitude. More particularly, these compressive forces are chosen to be low enough to permit the required slippage but high enough to insure reliable and smooth drive of the two reels by the capstan.

As has been pointed out in the introductory portion of this specification, the invention makes it possible to drive the reels directly from the peripheral surface of the capstan without the application of a resilient layer thereto. However, a very thin layer of such material, say in the order of 1 to 40 mils, may be applied to the capstan if this is desired in order to reduce the noise level to a minimum. Entirely satisfactory results have been obtained, for example, with a brass capstan of 3.062 inches diameter overlaid with a resilient layer of 0.001 inch of Lubeco 50 (supplied by Lubeco Inc., Compton, Cal.); and with an aluminum capstan of 3.00 inch substrate overlaid with a 5 milsor 20 mils thick layer of Dow Silastic silicone rubber of No. 4506 $\mu$-6-0–70 durometer Shore "A", Tests with capstans having a 40 mils elastic rubber coating and a 1.25 mil thick mylar belt made of five layers of 0.25 mil thick mylar splicing tape, showed no progression effects due to differential or changing force.

It will also be appreciated that the manner in which the two carriages are mounted for translational sliding movement as shown especially in FIGS. 1, 2 6–8 and 11, is simple, statically correct, and virtually friction free: three-point engagement is provided, by virture of the three rollers, between the latter and the associated guide rods, and because of the inherent spring action of arm 86, FIGS. 7 and 11, no separate resilient means are needed to insure such engagement. The characteristics of this arrangement result in a low-friction response of the carriages in their regular translational movement due to the increase of the take-up reel diameter and the simultaneous decrease of the diameter of the take-off reel in operation; and they also enable these carriages to easily and momentarily respond to reel runout. The same applies correspondingly to the modification shown in FIGS. 12 and 13.

As previously mentioned, a comparison between a prior art transport relying on the differential compression technique, and that according to this invention has shown that in the latter the periodic variations in tape tension due to runout were lowered by a factor of 30 to 50. In addition it has been found that with the use of a capstan having no, or only a negligible amount of, rubber coating, the frequency response of a servo system— assuming application of the invention to a video tape recording or playback apparatus — is improved and the resonance peaks which, as mentioned, appear in prior art systems at 100 to 200 Hz, are eliminated. A good servo response has also been obtained with a belted capstan.

It should be understood that the embodiments described herein are purely illustrative of the various aspects of the invention and are not intended in any sense to be limiting. For example, while in the embodiments described above, the brake means is in the form of a pivotally mounted brake arm, other types of brake means may also be used — including electrical brake means such as eddy current brakes, for example. One advantage in employing eddy current brakes is that it becomes possible thereby to readily switch the braking force off during quick turn-arounds. Ordinarily, during quick turn-arounds of the transport — when the supply hub is nearly empty and the take-up hub filled — a change in tape tension occurs for an approximately 80 millisecond period, because of the inertia of the moving parts involved. Such a change in the tape tension $f_t$ can be avoided, that is, the tape tension kept approximately constant, if the braking torque is suitably controlled at this time. The aforementioned objective can be met in a simple way and with reasonable accuracy by switching the braking force off during the time interval involved. This can easily be done if eddy current brakes are used for example. A constant tape tension during quick reversal is particularly desirable where the tape, as in the embodiment assumed above, rides on an air cushion in the vicinity of the magnetic head. The reason for this is that if this type of tape support is used, an increase in tape tension is liable to bring the tape in physical contact with the corresponding face of the air chamber. In short, the air layer which carries and protects the tape is in danger of being removed, and the tape caused to scrape along the aforementioned face;

this in turn is likely to create tape wear and may become a source of failure on quick turn-arounds. These adverse results can be largely eliminated, for example, by switching the braking force off as just explained.

What we claim is:

1. A tape transport apparatus comprising a pair of reels of recording tape forming supply and take-up reels, an annular rotating member for simultaneously driving both said reels by surface engagement with the outermost layer of tape on each reel, said annular rotating member and said reels being mounted for rotational movement, said reels being movably mounted relatively to said annular rotating member so as to allow for a variation in the spacing between the axis of said annular rotating member and the axes of said reels, means for providing a bias between said reels and said annular rotating member so as to produce a compressive force of substantially the same magnitude at the two locations of surface engagement between said annular rotating member and said two reels, respectively, and cause the spacing between the axis of said annular rotating member and the axes of said take-up and supply reels to increase and decrease, respectively, during the tape transporting operation, and brake means for said supply reel, said brake means having a reel-size dependent braking characteristic such that a decreasing braking torque is exerted on said supply reel as the spacing between the axis of said annular rotating member and the axis of said supply reel decreases during said operation and, hence, substantially constant tape tension maintained in the section of tape between said two locations of tape engagement regardless of the variation in reel sizes.

2. A tape transport apparatus as claimed in claim 1 wherein said annular rotating member has a tape engaging peripheral portion of resilient material of a thickness large enough to enable said reels to be smoothly driven by said capstan and small enough to allow for sufficient slippage between said peripheral portion and said tape at said two locations of tape engagement to permit said section of tape between said two locations to be so tensioned by the action of said brake means.

3. A tape transport comprising a pair of reels of recording tape forming supply and take-up reels, an annular rotating member for simultaneously driving both said reels by surface engagement with the outermost layer of tape on each reel while permitting a predetermined amount of slippage therebetween, said annular rotating member and said reels being mounted for rotational movement, said reels being movably mounted relatively to said annular rotating member so as to allow for a variation in the spacing between the axis of said annular rotating member and the axes of said reels, means for providing a bias between said reels and said annular rotating member so as to produce a compressive force of substantially the same magnitude at the two locations of surface engagement between said annular rotating member and said two reels, the magnitude of said compressive force being low enough to permit said required slippage but high enought to insure the reliable and smooth drive of said two reels by said capstan, said bias causing the spacing between the axis of said annular rotating member and the axes of said take-up and supply reels to increase and decrease, respectively, during the tape transporting operation, and brake means for said supply reel, said brake means having a reel-size dependent braking characteristic such that the braking torque exerted on said supply reel changes substantially in direct proportion to the spacing between the axis of said annular rotating member and the axis of said supply reel, whereby the tape tension in the section of tape between said two locations of surface engagement is maintained substantially constant.

4. A tape transport apparatus comprising a pair of axles each for carrying a reel of recording tape, the corresponding tape reels forming supply and take-up reels, a capstan, two carriages each rotatably supporting a corresponding one of said axles and each mounted to allow movement of said axles towards or away from the axis of said capstan, means for yieldingly biasing both of said carriages toward said capstan to produce compressive forces between said tape and said capstan of substantially the same magnitude at the two locations of engagement between said capstan and said two reels, respectively, and cause both said reels to be simultaneously driven by surface engagement between said capstan and the outermost layer of tape on each reel, so that the carriage of the supply reel and that of the take-up reel are bodily moved towards and away from said capstan, respectively, during the tape transporting operation and said transport apparatus also comprising, as a part thereof, brake means having a reel-size dependent braking characteristic, for each of said two axles to restrict the rotational movement thereof and means operatively and physically interposed between each of said brake means and the corresponding axle for making only the brake means for the axle of said supply reel effective.

5. A tape transport apparatus as claimed in claim 4, wherein said brake means is mounted on the frame of said transport apparatus.

6. A tape transport apparatus as claimed in claim 4 wherein said interposed means comprises unidirectional clutches.

7. A tape transport apparatus as claimed in claim 4 wherein said brake means include automatically acting braking torque control means, the last-mentioned means causing the braking torque exerted on said supply reel to decrease as the spacing between said capstan and the axis of said supply reel decreases during said operation.

8. A tape transport apparatus as claimed in claim 6 wherein each said operatively interposed means comprises a clutch designed to unidirectionally grip the corresponding axle and wherein each said brake means comprises a brake arm pivoted on the frame of said apparatus and urged against the outer cylindrical surface of the corresponding clutch to frictionally engage said cylindrical surface.

9. A tape transport apparatus comprising a pair of axles each for carrying a reel of recording tape, the corresponding tape reels forming supply and take-up reels, a capstan, two carriages each rotatably supporting a corresponding one of said axles and each mounted to allow movement of said axles towards or away from the axis of said capstan, means for yieldingly biasing both of said carriages toward said capstan to produce compressive forces between said tape and said capstan of substantially the same magnitude at the two locations of engagement between said capstan and said two reels, respectively, and cause both said reels to be simultaneously driven by surface engagement between said capstan and the outermost layer of tape on each reel, so that the carriage of the supply reel and that of the take-up reel are bodily moved towards and away from said capstan, respectively, during the tape transporting operation and said transport apparatus also comprising, as a part thereof, brake means for each of said two axles to restrict the rotational movement thereof and means operatively interposed between each of said brake means and the corresponding axle for making only the brake means for the axle of said supply reel effective; each said interposed means comprising a unidirectional clutch designed to unidirectionally grip the corresponding axle and each said brake means comprising a brake arm pivoted on the frame of said apparatus and resiliently urged against the outer cylindrical surface of the corresponding clutch to frictionally engage said cylindrical surface, said brake arm being pivoted at a point outside of the range of movement of the axis of the corresponding carriage so that the braking torque exerted on said supply reel is indirectly proportional to the difference between the distance of said point and the axis of said carriage from the periphery of said capstan.

10. A tape transport apparatus comprising a pair of axles each for carrying a reel of recording tape, the corresponding tape reels forming supply and take-up reels, a capstan, two carriages each rotatably supporting a corresponding one of said axles and each mounted to allow movement of said axles towards or away from the axis of said capstan, means for yieldingly biasing both of said carriages toward said capstan to produce compressive forces between said tape and said capstan of substantially the same magnitude at the two locations of engagement between said capstan and said two reels, respectively, and cause both said reels to be simultaneously driven by surface engagement between said capstan and the outermost layer of tape on each reel, so that the carriage of the supply reel and that of the take-up reel are bodily moved towards and away from said capstan, respectively, during the tape transporting operation and said transport apparatus also comprising, as a part thereof, brake means for each of said two axles to restrict the rotational movement thereof and means operatively interposed between each of said brake means and the corresponding axle for making only the brake means for the axle of said supply reel effective; each said interposed means comprising a unidirectional clutch designed to unidirectionally grip the corresponding axle and each said brake means comprising a brake arm pivoted on the frame of said apparatus and resiliently urged against the outer cylindrical surface of the corresponding clutch to frictionally engage said cylindrical surface, each said clutch being fixedly mounted for rotation in a boss of the corresponding carriage and the brake arm of the corresponding brake means extending through a window in said boss.

11. A tape transport as claimed in claim 10 wherein the distance of said pivot point from the periphery of said capstan is chosen so that said braking torque changes substantially in direct proportion to the distance of the axis of said carriage from said periphery.

12. A tape transport as claimed in claim 11 wherein the midpoint of the distance of said pivot point from the periphery of said capstan is chosen so as to substantially coincide with the midpoint of said range of movement.

13. A tape transport apparatus as claimed in claim 8 wherein there are provided means for adjusting the resilient force by which said brake arm is urged against said cylindrical surface.

14. A tape transport apparatus comprising a pair of axles each for carrying a reel of recording tape, the corresponding tape reels forming supply and take-up reels, a capstan, two carriages each rotatably supporting a corresponding one of said axles and each mounted to allow movement of said axles towards or away from the axis of said capstan, means for yieldingly biasing both of said carriages toward said capstan to produce compressive forces between said tape and said capstan of substantially the same magnitude at the two locations of engagement between said capstan and said two reels, respectively, and cause both said reels to be simultaneously driven by surface engagement between said capstan and the outermost layer of tape on each reel, so that the carriage of the supply reel and that of the take-up reel are bodily moved towards and away from said capstan, respectively, during the tape transporting operation and said transport apparatus also comprising, as a part thereof, brake means for each of said two axles to restrict the rotational movement thereof and means operatively interposed between each of said brake means and the corresponding axle for making only the brake means for the axle of said supply reel effective; and for ensuring low-friction movement of each said carriage towards or away from said capstan, there being mounted on opposite sides of the frame of said apparatus two guideways, and each said carriage carrying a pair of rollers journaled at spaced and relatively fixed points on one side of said carriage for engagement with one of said guideways and additionally carrying, journaled on the opposite side of said carriage, a third roller resiliently urged towards the other guideway for engagement therewith.

15. A tape transport apparatus as claimed in claim 14 wherein said guideways comprise cylindrical rods mounted on said frame for engagement by said pair of rollers and said third roller, respectively.

16. A tape transport apparatus as claimed in claim 14 wherein, for providing low-friction movement of each said carriage towards or away from said capstan, there are mounted on opposite sides of the frame of said apparatus two guideways having V-shaped guide faces and wherein two corresponding V-shaped guide faces are formed on opposite sides of each said carriage, a nest of bearing balls being interposed in parallel relationship between each cooperating pair of said V-shaped guide faces.

17. A tape transport apparatus comprising a pair of axles each for carrying a reel of recording tape, the corresponding tape reels forming supply and take-up reels, a capstan, two carriages each rotatably supporting a corresponding one of said axles and each mounted to allow movement of said axles towards or away from the axis of said capstan, means for yieldingly biasing both of said carriages toward said capstan to cause both said reels to be simultaneously driven by surface engagement between said capstan and the outermost layer of tape on each reel, so that the carriage of the supply reel and that of the take-up reel are bodily moved towards and away from said capstan, respectively, during the tape transporting operation and said transport apparatus also comprising, as a part thereof, brake means having a reel-size dependent braking characteristic, for each of said two axles to restrict the rotational movement thereof and means operatively and physically interposed between each of said brake means and the corresponding axle for making only the brake means for the axle of said supply reel effective, each said interposed means comprising a unidirectional clutch gripping the corresponding axle in only one direction of rotation of the clutch, the clutch being freewheeling in the opposite direction, and each said brake means comprising means resiliently urged against the outer cylindrical surface of the corresponding clutch to frictionally engage said cylindrical surface.

18. A tape transport apparatus comprising a pair of axles, each for carrying a reel of recording tape, the corresponding two reels forming supply and take-up reels, an annular rotating member rotatably mounted to the frame of said tape transport apparatus for simultaneously driving both said reels by surface engagement with the outermost layer of tape on each reel, two carriages each rotatably supporting the corresponding one of said axles, low-friction means between said carriages and said frame for enabling each said carriage to be bodily moved towards or away from said annular rotating member, means for yieldingly and substantially equally biasing both of said carriages toward said annular rotating member so that both said reels are simultaneously driven by surface engagement between said annular rotating member and the outermost layer of tape on each reel and that the carriage of the supply reel and that of the take-up reel are bodily moved towards and away from said annular rotating member, respectively, during the tape transporting operation, and selectively operable brake means for said reels, said low-friction means including two guideways mounted on opposite sides of the frame of said apparatus and three rollers carried by each said carriage, two of said rollers being journaled at spaced and relatively fixed points on one side of said carriage for engagement with one of said guideways and the third roller being journaled on the opposite side of said carriage and resiliently urged toward the other guideway for engagement therewith.

* * * * *